United States Patent [19]

Vogele

[11] Patent Number: 4,967,893
[45] Date of Patent: Nov. 6, 1990

[54] FRICTION ASSEMBLY

[75] Inventor: Richard Vogele, Altlussheim, Fed. Rep. of Germany

[73] Assignee: Borg-Warner Automotive GmbH, Heidelberg, Fed. Rep. of Germany

[21] Appl. No.: 438,651

[22] Filed: Nov. 17, 1989

[30] Foreign Application Priority Data

Dec. 9, 1988 [EP] European Pat. Off. ......... 88120585.0

[51] Int. Cl.⁵ .................... F16D 13/64; F16D 65/12
[52] U.S. Cl. .................... 192/107 R; 192/70.16; 188/218 XL; 403/372
[58] Field of Search .......... 192/70.16, 107 R; 188/218 XL, 73.1, 18 A, 73.2; 403/365, 371, 372, 408.1

[56] References Cited

U.S. PATENT DOCUMENTS

| | | | |
|---|---|---|---|
| 1,982,235 | 11/1934 | Shepered | 192/107 R X |
| 3,300,853 | 1/1967 | Gabbert | 192/107 C X |
| 3,926,285 | 12/1975 | Preller et al. | 188/218 XL |
| 3,994,370 | 11/1976 | Gebhardt et al. | 188/218 XL |
| 4,022,310 | 5/1977 | de Gennas | 192/107 C |
| 4,026,393 | 5/1977 | Gebhardt et al. | 188/218 XL |
| 4,108,286 | 8/1978 | Gagarin | 188/218 XL |
| 4,132,294 | 1/1979 | Poli | 188/218 XL |
| 4,280,598 | 7/1981 | Pöllinger | 188/218 XL |
| 4,645,041 | 2/1987 | Bass | 188/218 XL |

FOREIGN PATENT DOCUMENTS

| | | |
|---|---|---|
| 0178497 | 4/1986 | European Pat. Off. |
| 2758840 | 7/1979 | Fed. Rep. of Germany |
| 1080035 | 8/1967 | United Kingdom ......... 188/218 XL |
| 1474964 | 5/1977 | United Kingdom |

*Primary Examiner*—Richard Lorence
*Attorney, Agent, or Firm*—Charles R. Schaub; Greg Dziegielewski

[57] ABSTRACT

A friction assembly is disclosed. A support plate which functions as a friction lining support, is connected with hub plates which are placed against both its frontal sides by using slitted spring collets.

15 Claims, 3 Drawing Sheets

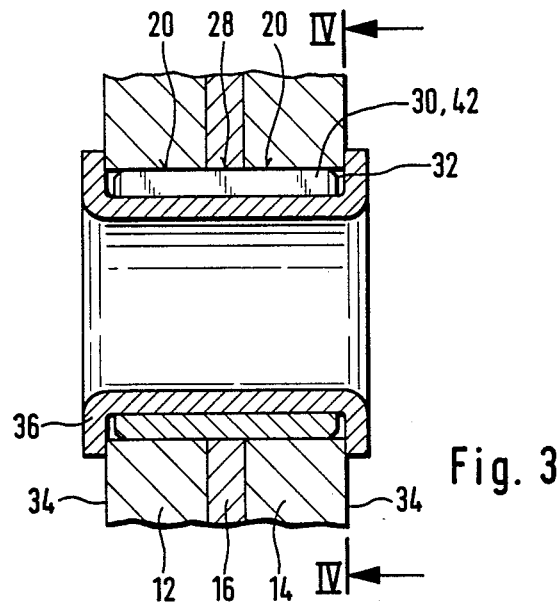
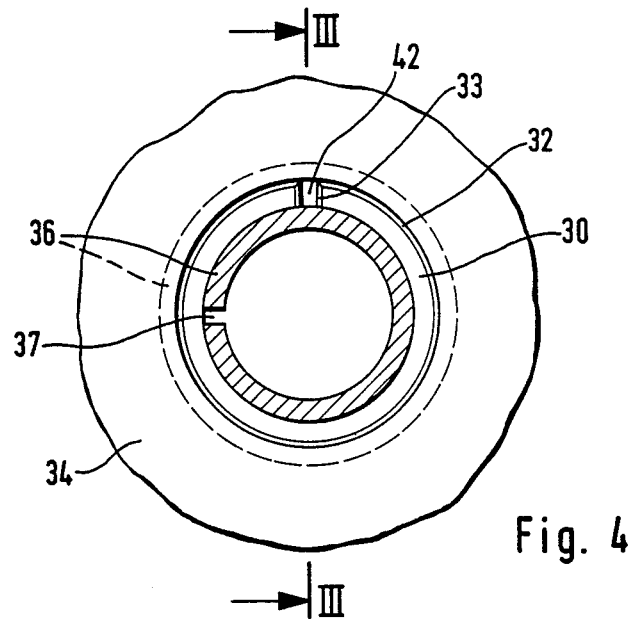

FRICTION ASSEMBLY

BACKGROUND OF THE INVENTION

The invention relates to a friction assembly, such as a clutch disk, a brake disk, or similar part. The assembly has a support plate which carries a friction lining and an internal hub which is firmly attached to the hub and is thicker than the support plate.

Friction assemblies are known in which the support plate and hub are part of a one-part thick-walled ring body on which the friction lining is provided. A relatively large thickness of the ring body is required, in such prior art assemblies, because of the surface pressure resulting from the torque transfer in the internal gearing, with which the friction element is usually connected via a shaft.

Knocking, because of vibrations, should be prevented. For clutch disks and brake disks, as used in the construction of heavy machines, there are requirements for low use of material, low moment of inertia, and high carrying capacity. These requirements can be satisfied with a smaller support plate thickness in the area of the friction lining. In addition to a decrease in the rotating masses, the spatial requirements for the friction assembly are also reduced, which is an advantage in cases of use where the available space for construction is small. A thinner support plate also permits, given a certain thickness of the entire friction element, an increase in the thickness of the friction lining and the formation of deeper grooves for leading the oil to the friction linings. This improves the removal of heat and increases the service life of the friction assembly. In general, if thicker friction surfaces are used, the decrease in the thickness of the support plate results in a decrease in the total thickness of the friction assembly.

There exists the possibility of machining a thick unit to cut down the area which supports the friction lining, in order to decrease its thickness in comparison to the hub area. Such a process of manufacturing is, however, very involved and expensive.

German Patent No. OS 2,758,840 discloses a friction assembly in which the support plate and the hub which serve as carriers for the friction lining are separate parts and are interconnected by an unitary joint connection made of these parts themselves. Pins are mentioned which are constructed as an internal part of the hub. The pins grip through openings in the support plate and are plastically deformed, in the manner of a riveted joint, by the application of pressure. In addition, a positive lock of the joining marginal zones of hub and support plate and a joint bonding such as soldering, welding, or glue connection have been suggested.

A rivet joint between a hub and external ring is known from German Patent No. OS 3,436,306, British Patent No. 1,474,964, and U.S. Pat. Nos. 3,300,853 and 4,022,310. As explained in further detail below, tensions are created in the parts to be joined during the riveting, which leads to evenness problems.

The suggested positive locking joint connections between hub and support plate are very involved from the point of view of manufacturing technology. Glue connections are unsatisfactory with regard to carrying capacity and durability. If, because of processing reasons, the connection can only be made after the friction lining has been attached to the support plate, a welded connection cannot be considered because of the thermal stresses involved.

For a rivet joint between hub and support plate, the friction element in the hub zone is made relatively thick. This form cannot always be used because of lack of space. In order to achieve a durable connection for the transfer of torque by means of riveting, a filling ratio as good as possible is required. This ratio in turn can only be achieved if very large forces are used which result in a high degree of flowability in the rivets. As a result, uneven high pressures are generated at some sites in the bores of the support plate, which can lead to undesirable dishing and unevenness of the support plate. As a result, it is difficult to stay within the narrow tolerances which are required in the use of the friction elements as brake disks in, for example, the axle cones of tractors and other all-terrain vehicles. Such brake disks are placed between the brake piston and the stopping disk to convert the kinetic energy of the vehicle which is in motion, either entirely or partially, into heat as a result of friction, when the vehicle is to be stopped or its velocity is to be reduced. Because of the limited force which the driver can apply to activate the pedal, as well as because there exists a maximum pedal travel, there is little room for play. A very small exceeding of thickness tolerances, unevennesses, dishing, and waviness quickly brings the brake disk in contact with neighboring parts. This leads to acceptably high drag torques, premature wearing, and heating of neighboring parts, as well as power loss.

The demand for a construction part which is built with great precision regarding tolerances and shape deviations can be reached in the case of rivet joints of a hub and support plate only if small riveting forces are used. However, this may lead to an unsatisfactory filling ratio with a decrease in supporting surface. Although precision punching can be used to reduce the sum of the additive measurement and position tolerances, the tolerance levels reached in contemporary mass production are insufficient to achieve the desired degree of accuracy by means of riveting. In addition, during braking, high temperatures can occur in the friction element which change the tension situation as generated during the riveting. This, again, can lead to new deformation. The torques which need to be transferred are small. Last, but not least, torque pulses can result in a deformation of the rivets which, because of the machining requirements, are soft.

SUMMARY OF THE INVENTION

The purpose of the invention is to supply a friction assembly of the type mentioned above in which the support plate and the hub which serve as supports for the friction lining are connected by a means that is less involved from a fabrication technology point of view and that meets the following three requirements:
1. durable torque transfer;
2. compensation of tolerances in the parts to be connected; and
3. no deformation of the support plate fitted with the friction lining.

This problem is solved, according to the present invention, by means of a friction assembly in which the support plate and hub are connected without play by means of spring collets which are held captive in aligned bores for the transmission of the torque.

The spring collets used according to the invention guarantee a torque connection between the support plate and the hub without any tensions, as occur in a rivet connection. The friction surfaces can be attached to the support plate and grooves can be milled through it, before the connection is established between the support plate and the hub.

The spring collets can have a cylindrical bushing body with a longitudinal slit. They can be made out of hardened spring steel and can be provided at least one end, and preferably at both ends, with a bevel. Optionally a bevel can be provided extending in the longitudinal direction. The spring collets preferably have dimensions that are such that they are held with initial tension in the bores of the support plate and the hub. The slit ends of the spring collets, after assembly, are in contact with each other or separated by only a small clearance so that approximately identical pressures are generated over the circumference of the bore. The spring collets brace each other at the time of the introduction of the torque and they act as a closed ring. Their elasticity is such that they fit the bores with different diameter and position tolerances without exerting any forces which lead to deformation of the support plate. The spring collets, because of their spring properties, exhibit elasticity to impulses. This results in a more even distribution of pressures in the bores and an improvement of the durable connection.

Assembly sleeves, such as metal sleeves, can be provided which pass through the spring collets and pull the support plate and hub together in the axial direction. The assembly sleeves are preferably slit in the longitudinal direction. They rest without initial tension in the spring collets. The assembly sleeves either do not contribute to the torque transfer or only contribute insignificantly. Their only function is to keep the friction assemblies together in the axial direction and they secure the spring collets in their assembled position. The assembly sleeves can have a sleeve body which have turned over edges at both ends. The sleeve body is made of a material which can be deformed plastically without any involved deformation work. A preferred material is a soft steel. When the edges of the sleeve bodies made of this material are turned over, no pressures are generated which could reduce the evenness of the support plate used as a lining support.

The hub of the friction assembly, according to the invention, preferably consists of two hub plates arranged on both sides of a support plate. This results in an even distribution of forces and torques and a correspondingly high load capacity. The hub plates can be manufactured using the same forming tool, such as a precision punching tool. The hub plates are affixed to the support plate with the support plate in the same axial direction and relative angular position in which they leave the forming tool, that is, without any relative angular shift. The spring collets which are inserted with initial tension in the bores ensure a correct orientation of the hub plates. Therefore, the hub plates are connected with the support plate in an exact alignment, without any partition errors and without any play, and they assume corresponding exactly identical support positions. In this manner, the toothed sides of the hub plates are also oriented precisely as required by the configuration.

The invention is explained in further detail on the basis of the embodiments illustrated in the drawings.

DESCRIPTION OF THE DRAWINGS

FIG. 3 is an enlarged detail of the axial cross section through a connection site of the brake disk taken along lines III—III of FIGS. 1 and 4; and FIG. 4 is a cross section taken along the line IV—IV of FIG. 3.

DESCRIPTION OF THE PREFERRED EMBODIMENTS

Figure 1:
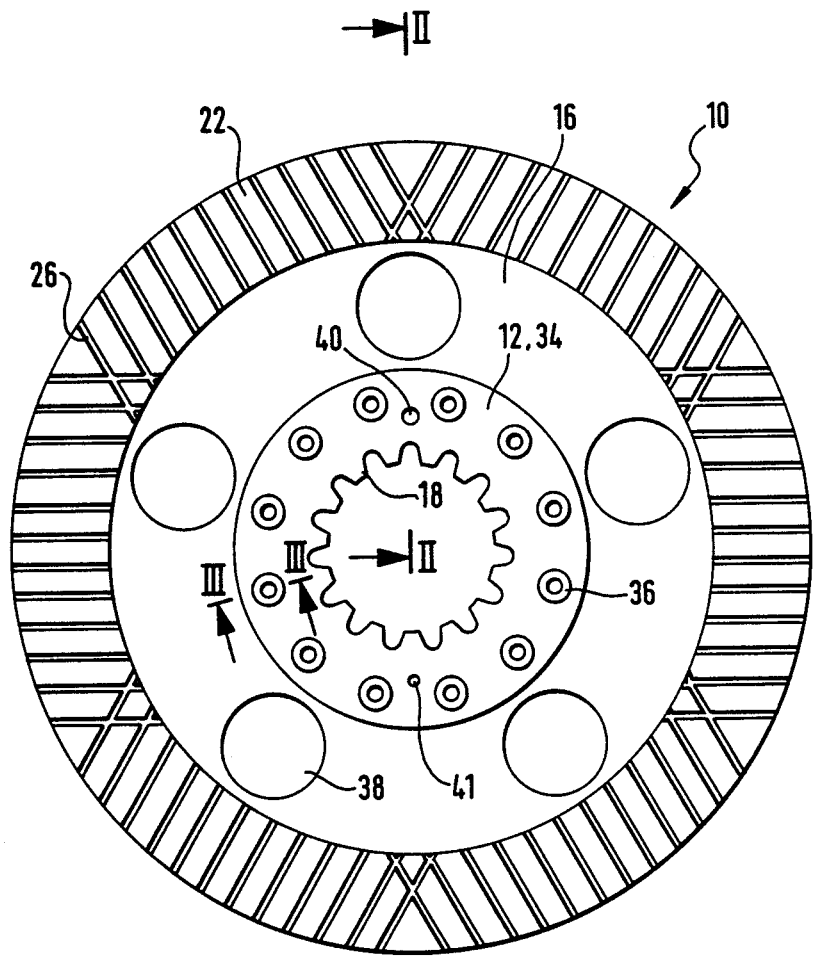
FIG. 1 is an axial top view of a friction assembly, specifically a brake disk, constructed according to the present invention.

A friction assembly and more specifically a brake disk, according to the present invention, is indicated in the drawings by the reference number 10. Other friction assemblies also fall with the scope of the present invention and claims.

Figure 2:
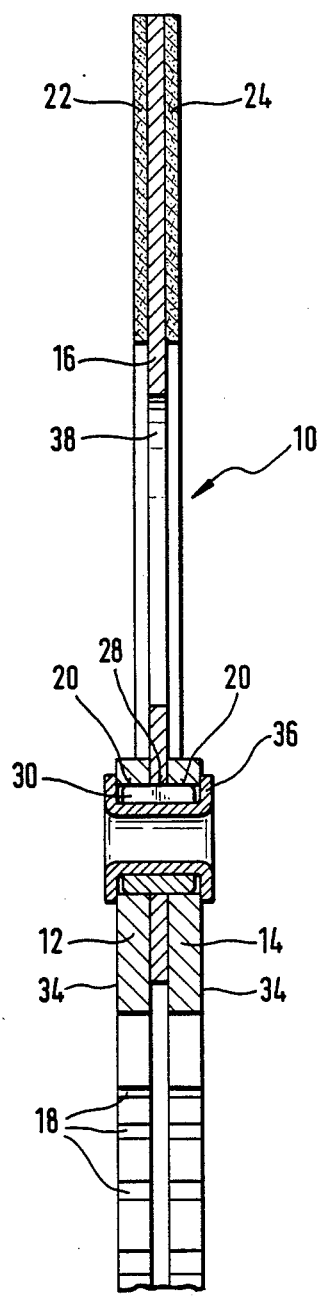
FIG. 2 is an axial cross section, through one side of the brake disk, taken along the line II—II of FIG. 1.

The brake disk 10 has two hub plates 12, 14 which are arranged parallel to each other. A support plate 16 is mounted between the hub plates 12, 14 and serves as a friction lining support. Hub plates 12, 14 are essentially in the shape of a ring and their internal circumference is fitted with internal gearing 18 (see FIG. 2) for the reception of the drive shaft. The thickness of hub plates 12, 14 depends on the surface pressure which occurs in the gearing zone. Both hub plates 12, 14, on their circumferences, have an identical number of bores 20 arranged in a concentric ring at the same angular distance.

The support plate 16 is a ring with friction linings 22, 24 on both sides close to its outer edge. The friction linings 22, 24 are firmly connected to support plate 16. Friction linings 22, 24 have grooves 26 (see FIG. 1) which have a ribbed profile and form a groove pattern. The friction linings 22, 24 can have any other arrangements in addition to the one illustrated in the drawings. Advantages of the grooving include the achievement of a rapid insertion; the increase in the efficacy of the brake; and a high, unchanging friction coefficient. The heat produced during the contact and the slide phase is removed through the oil stream.

The internal diameter of support plate 16 is somewhat smaller than the external diameter of hub plates 12, 14, so that an overlap is formed during assembly. The support plate 16 has a concentric ring of holes, whose diameter corresponds to that of the ring of holes of hub plates 12, 14. The number of holes or bores 28 in the support plate 16 are placed at identical intervals and have the same diameter, as the holes or bores 20 in the plates 12, 14. Thus, in the assembly position, each bore 20 in one hub plate 12 is aligned with a bore 28 in support plate 16 and a bore 20 in the other hub plate 14.

Slit spring collets 30 with a spring action serve for the transfer of the torque. Preferably the spring collets 30 are constructed of hardened spring steel. The spring collets 30 are inserted with initial tension into the aligned bores 20, 28 of both hub plates 12, 14 and support plate 16. The spring collets 30 can have a longitudinal slit 42 extending in the axial direction (see FIG. 4), but they can also be provided with other slits. Because of the initial tensioning of the collets 30 in bores 20, 28, a radial pressure is exerted towards the outside. The insertion of spring collets 30 in bores 20, 28 is facilitated by means of a bevel 32 provided at one end, and preferably at both ends, of each spring collet 30. The edges of longitudinal slit 42 are also provided with bevels 33.

Spring collets 30 assume an axial middle position in bores 20, 28, in which their ends assume a position which is somewhat depressed with respect to the external frontal surface 34 of hub plates 12, 14.

In order to keep the friction assemblies together in the axial direction, as well as to provide a securing of the spring collets 30 in the bores 20, 28, metal sleeves, for example, metal sleeves 36 are provided which are inserted in each of the spring collets 30. The free ends of the sleeves 36 project by a distance which is greater than the thickness of the spring collets 30 beyond the frontal surfaces 34 of hub plates 12, 14. The sleeves 36 have a longitudinal slit 37 (see FIG. 4). In contrast to the spring collets 30, which are preferably made of hardened spring steel, soft steel or iron is used as a material for the sleeves 36. After completion of the insertion, the ends of sleeves 36 can be turned over at their edge without a great deal of deformation work. The sleeves 36 are thus braced against the external frontal surfaces 34 of the hub plates 12, 14, in order to keep the friction assemblies together and to prevent the spring collets 30 from sliding out. In this manner, the hub plates 12, 14 are connected to support plate 16 in a manner which prevents rotating or shaking.

In a sequence of assembly, the spring collets 30 are first inserted into the bores 20, 28. In a subsequent work step, the sleeves 36 are passed through the collets 30 and their edges turned over. In the alternate, the spring collets 30 are preassembled with the sleeves 36 and the combined elements inserted into the bores 20, 28.

The support plate 16 is provided with a smaller number of larger bores 38 between the ring of assembly bores 20, 28 and the ring-shaped friction linings 20, 24. The larger bores 38 have the same diameter and the same angular separation. These bores 38 provides an improved passage of oil and they also result in weight reduction.

The two hub plates 12, 14 are precision punched parts manufactured with the same punching tool. They are in the axial position with respect to each other in which they left the punching tool. Thus, for example, if external frontal surface 34 forms the upper side of hub plate 12 which comes out of the punching tool, then the external frontal surface 34 of the other hub plate 14 is its underside, at the time it leaves the punching tool. Hub plates 12, 14 are arranged in the relative angular position in which they are when they leave the punching tool, that is with zero angular shift. This is guaranteed by means of one pair of aligned pilot bores 40, 41, each having a different diameter, provided in hub plates 12, 14. Pilot bores 40, 41 are arranged with an angular separation of 180° on a concentric circle between bores 20 of hub plates 12, 14 and the internal gearing 18.

The manufacturing of the brake disk 10, according to the invention, is cost effective because no cutting procedures are used and compression with relatively small forces can be used. A disk and/or wave-shaped deformation of the brake disk, as occurs during a rivet connection between the hub and the support plate is avoided, so that the brake disk is characterized by a very good planar surface. Because of the design of the hub zone, the brake disk 10, according to the invention, is very compact. It can also be used in the case of assembly in a small space and with torques which have to be transferred through spring collets 30 which are extremely high.

I claim:

1. A friction assembly comprising a support plate, a friction lining mounted on said support plate, said support plate defining a plurality of bores, at least one hub connected to said support plate, said hub defining a plurality of holes aligned with such bores of said support plate, a plurality of spring collets positioned in such aligned holes and bores to connect said hub to said support plate for the transmission of torque and means for holding said support plate and said hub together in an axial direction, said holding means comprising an assembly sleeve having opposed ends, positioned within a respective one of said spring collets, said ends of said assembly sleeve having means to axially hold said collets.

2. A friction assembly, according to claim 1, wherein said collets apply an initial tension force to connect said support plate and said hub without play.

3. A friction assembly, according to claim 1, wherein each of said spring collets has a cylindrical longitudinally extending bushing body, said body having a slit in the longitudinal direction.

4. A friction assembly, according to claim 3, including a bevel at one end of said body.

5. A friction assembly, according to claim 3, wherein said spring collets are constructed from a spring steel.

6. A friction assembly, according to claim 1, wherein said assembly sleeve is constructed of a soft metal.

7. A friction assembly, according to claim 1, wherein said assembly sleeve is constructed of a soft steel.

8. A friction assembly, according to claim 1, wherein said assembly sleeve has a longitudinally extending body, said body including a longitudinal slit.

9. A friction assembly, according to claim 1, wherein two hubs are connected on opposite sides of said support plate.

10. A friction assembly comprising a support plate, a friction lining mounted on said support plate, said support plate defining a plurality of bores, at least one hub connected to said support plate, said hub defining a plurality of holes aligned with such bores of said support plate, a plurality of spring collets positioned in such aligned holes and bores to connect said hub to said support plate for the transmission of torque, wherein each of said spring collets has a cylindrical longitudinally extending bushing body, said body having a slit in the longitudinal direction, and means for holding said support plate and said hub together in an axial direction, said holding means comprising an assembly sleeve having opposed ends, positioned within a respective one of said spring collets, said ends of said assembly sleeve being turned over to form flanges which capture and axially hold said collets, said assembly sleeve having a longitudinally extending body, said body including a longitudinal slit.

11. A friction assembly, according to claim 10, including a bevel at one end of said bushing body.

12. A friction assembly, according to claim 10, wherein said spring collets are constructed from a spring steel.

13. A friction assembly, according to claim 10, wherein said assembly sleeve is constructed of a soft metal.

14. A friction assembly, according to claim 10, wherein said assembly sleeve is constructed of a soft steel.

15. A friction assembly, according to claim 10, wherein two hubs are connected on opposite sides of said support plate.

* * * * *